United States Patent [19]
Brand et al.

[11] 3,853,732
[45] Dec. 10, 1974

[54] ELECTRODE STRUCTURE FOR POTENTIOMETRIC SAMPLE ANALYSIS

[75] Inventors: Albert H. Brand, Briarcliff Manor; R. Jagan Mohan Rao, Tarrytown, both of N.Y.

[73] Assignee: Technicon Instruments Corporation, Tarrytown, N.Y.

[22] Filed: Apr. 10, 1972

[21] Appl. No.: 242,507

[52] U.S. Cl. ........ 204/195 F, 204/1 T, 204/195 G, 204/195 M
[51] Int. Cl. ............................................. G01n 27/46
[58] Field of Search ........ 204/195 R, 195 G, 195 F, 204/195 M, 195 L

[56] References Cited
UNITED STATES PATENTS

| | | | |
|---|---|---|---|
| 3,151,052 | 9/1964 | Arthur et al. | 204/195 F |
| 3,298,944 | 1/1967 | Luck | 204/195 F |
| 3,398,079 | 8/1968 | Arthur et al. | 204/195 G |
| 3,424,664 | 1/1969 | Severinghaus | 204/195 G |
| 3,700,577 | 10/1972 | Grauer | 204/195 G |

*Primary Examiner*—T. Tung
*Attorney, Agent, or Firm*—S. P. Tedesco; S. E. Rockwell

[57] ABSTRACT

A reference electrode structure for use in electrochemical measurements well adapted for inclusion in a compact unit including a cooperating ion-selective electrode, for liquid sample analysis of the continuous-flow type, and which reference electrode is of the open liquid junction type. The structure provides a straight-through path portion for the sample flowing in a stream and having at least substantially full circumferential exposure with an electrolyte or salt bridge of the reference electrode, which electrolyte flows in the aforementioned liquid junction. Use is not restricted to analysis of the continuous-flow type but includes analysis of the batch type.

4 Claims, 2 Drawing Figures

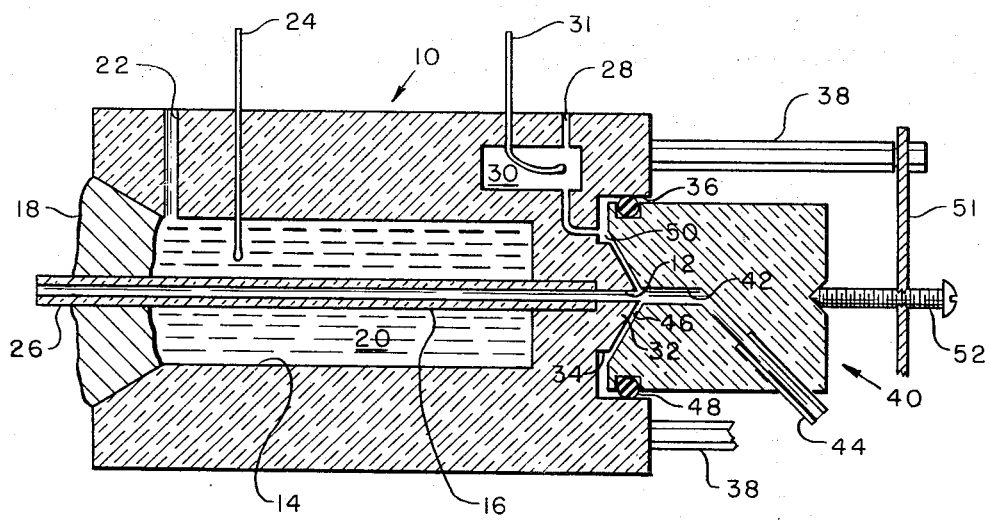
FIG_1
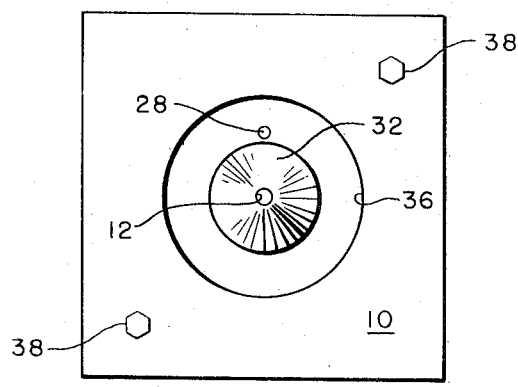
FIG_2

ELECTRODE STRUCTURE FOR POTENTIOMETRIC SAMPLE ANALYSIS

BACKGROUND OF THE INVENTION

1. Field of Invention

This invention relates to apparatus for potentiometric analysis of liquid samples, including a reference electrode of tye type providing an open leak junction.

2. Prior Art

Electrochemical analysis of liquid samples for ionic parameters such as pH determinations and determinations of cadmium, calcium, chloride and fluoride, to mention only a few, is now well known. Potentiometric methods of analysis of substances such as sodium and potassium offer the advantages of simplicity, ease of operation and precision which is at least as good as, if not better than, currently obtainable with flame photometric methods.

Apparatus for analyzing small liquid samples such as blood is known which comprises a body having a small passage through which the liquid sample passes. An axial opening in an arm branching off the body communicates with the liquid passage. A sensing electrode, such as a glass electrode, is of such configuration as to be removably supported in the opening. The sensing electrode includes a glass bulb the exterior of which forms a portion of the first mentioned liquid passage and which bulb has a sensing surface portion thereof for contact by the liquid sample. A reference electrode is coupled to the opening by a salt bridge with the salt bridge solution communicating with the sample passageway via an electrolytic path or liquid junction provided between the ground glass surface of the sensing electrode and the opening in which it is mounted. The liquid junction is formed around at least a portion of the periphery of the bulb. Hence, the liquid sample has substantially less than full circumferential exposure to the salt bridge flowing in the open liquid junction. Such apparatus is illustrated and described in Arthur et al. U.S. Pat. No. 3,398,079 issued Aug. 20, 1968. An open leak junction is preferred in many instances to a liquid junction of the fiber type or a liquid junction of the ceramic type because it will not clog as readily and, as in the apparatus of that patent, an open leak junction may be easily cleaned if it does clog. This apparatus of the Arthur et al. U.S. Pat. No. 3,398,079 is described with reference to both anaylsis of the batch type and analysis of the continuous-flow type.

There is illustrated in Shiller U.S. Pat. No. 3,357,910 issued Dec. 12, 1967 an ion-selective electrode structure for analysis of the batch type and including an ion sensitive surface portion formed, not as a portion of the bulb as in Arthur et al. U.S. Pat. No. 3,398,079, but as a glass capillary into which the sample is inletted and from which it is expelled after each test. While the sample is confined in the capillary tube it is exposed to an electrolyte or a salt bridge by a dipping process.

Use of potentiometric measurements in analysis of the continuous-flow type, utilizing a series of samples presented seriatum by a sampler, has been reported by Harold Jacobson in *Analytical Chemistry*, Vol. 38, No. 13, pages 1951–1954, Dec., 1966. In that reported analysis, sensing glass electrodes were used similar to that illustrated and described in Arthur et al. U.S. Pat. No. 3,398,079, identified in the Jacobson article as Beckman sensing glass electrodes Nos. 39046 and 39047 utilized with a single Beckman reference electrode No. 39070.

Another potentiometric measurement system utilizing the continuous-flow type of analysis has been reported by J. Ruzicka and J. C. Tjell in *Anal. Chim. Acta*, 47 (1969) pages 475–482 published in Amsterdam by Elsevier Publishing Company, wherein there is illustrated and described a passage for a sample stream in which in tandem relation a sensing electrode and a reference electrode are both exposed to the sample stream so as to have spot contact with respective peripheral portions of the sample stream.

A problem encountered heretofore in the use of electrodes for analysis of the potentiometric type, especially but not limited to analysis of the continuous-flow type, has been providing good exposure of the sample to the ion-selective surface of the sensing electrode and good contact of the sample with the salt bridge of the reference electrode. The salt bridge or liquid junction with the sample should not clog, as it is prone to do in the above-discussed prior art structures, and if it does clog it should be easy to clean. Another disadvantage of the prior art structures is that they have not been compact and have occupied considerable space, particularly in equipment of the continuous-flow type. Another drawback to prior art equipment for continuous-flow analysis has been with reference to the wash between samples of the electrode portion of the system. The wash characteristics have been poor.

SUMMARY OF THE INVENTION

One object of the invention is to provide a reference electrode structure for use in electrochemical measurements, having an improved open liquid junction with a sample chamber or passage, which junction effectively inhibits clogging. Another object is to provide such a liquid junction which, in the unlikely event that it does clog, may be easily cleaned. Still another object is to provide such a liquid junction which has improved cooperation with the sample passage.

A further object is to provide such an electrode structure which is well adapted for inclusion in a compact unit including a cooperating ion-selective electrode. The structure provides a straight-through path portion for the sample, which sample while in the structure has at least substantially full circumferential exposure with an electrolyte or salt bridge of the reference electrode, which electrolyte flows in the aforementioned liquid junction. Another object is to provide such an electrode structure which has good wash characteristics, and an electrode structure which in use is not restricted to analysis of the continuous-flow type but may be used in analysis of the batch type.

BRIEF DESCRIPTION OF THE DRAWING

In the drawing:

FIG. 1 is a greatly enlarged longitudinal sectional view in elevation, illustrating an electrode structure embodying the invention; and FIG. 2 is an end view of the right-hand end of the electrode structure shown in FIG. 1 with one of the members thereof removed, as for cleaning the aforementioned liquid junction.

DETAILED DESCRIPTION OF THE PREFERRED EMBODIMENTS

The electrode structure shown in FIGS. 1 and 2 comprises a horizontally elongated body member 10 of block-like form structured of an insulating material and having a longitudinal bore 12 therethrough enlarged as at 14. In the bore 12 arranged axially thereof there is a tube 16 structured of an ion-selective material of any suitable type and fixed in the bore 12 by any suitable means. The tube 16 may be a capillary tube.

As shown in FIG. 1 the tube 16 has an outer diameter considerably less than the enlargement 14 of the bore and extends to the left beyond the block 10. The inner diameter of the tube 16 is flush with the portion of the bore 12 of smaller diameter. The tube 16 extends through a suitable seal 18, which seal forms with the body member 10 and the tube 16 in the area of the bore enlargement 14 a chamber 20 for the electrolyte filling solution of the internal reference electrode. The chamber 20 is preferably provided with a filling port 22 in the body member 10 which may be closed by a suitable plug not shown. The tube 16 in the area where it passes through the chamber 20 is completely surrounded by the electrolyte solution in the chamber. The ion-selective half cell is completed by an internal reference electrode 24 which may be of conventional silver-silver chloride wire by way of example and which is shown extending into the body member 10 and into the electrolyte in the chamber 20. The inlet end of the tube 16 which tube forms a sample passage is indicated at 26.

It is to be noted that the ion-selective tube 16 may be structured as a membrane of any suitable ion-selective material but may be considered, for purposes of illustration and not by way of limitation, as structured of sodium-selective glass. While the structure discussed above with reference to the ion-selective portion of the electrode structure is particularly advantageous when used with the reference electrode portion of the structure to be described hereinafter, it is not required. By this it is meant that the ion-selective portion of the combination electrode may take a form other than the tubular form shown, with the ion-selective surface exposed in the sample passage constructed in any suitable manner as in the apparatus illustrated and described by Ruzicka and Tjell, supra. While a single indicator or ion-selective electrode has been illustrated and described, it will be apparent to those versed in the art, that plural indicator electrodes, each selective to a different ion, may be utilized with a common reference electrode.

The reference electrode portion of the combined electrode structure includes a conduit 28 in the member 10 which is interrupted by a pocket 30 formed in the member 10. The conduit 28 is provided with an inlet through the top of the block, as shown in FIG. 1, which may be connected to a pressurized source or head of electrolyte filling solution, not shown. The outlet of the conduit 28 is through the right-hand end of the block 10 as viewed in FIG. 1. The pocket 30 is kept filled with the last-mentioned electrolyte. An electrode 31 which, for illustrative purposes only, may be formed of silver-silver chloride wire extends into the member 10 and into the pocket 30 for contact with the electrolyte therein, as shown in FIG. 1.

The sample passage extends from the tube 16 to the right into the passage 12 which is continued through the axis of a boss 32 of the block-member 10 which boss is formed as a truncated cone, as shown in FIG. 1. Located adjoining the base of the cone 32, the member 10 has a cylindrical shoulder 34. Concentric with the cylindrical shoulder 34, the block member is provided with a recess 36 opening through the right end of the member 10 as shown in FIG. 1. The discharge of the conduit 28 is spaced in a plane slightly above the cylindrical surface 34 as shown in the last-mentioned view. The construction and arrangement of the boss 32 is such that it forms, together with the portion bounded by the annular shoulder 34, a raised central portion of the bottom of the recess 36.

Radially outwardly of the recess 36, the block 10 is provided with a pair of horizontally extending metal studs diametrically opposite one another with reference to the recess 36, the studs being indicated at 38. Each stud 38 has one end thereof suitably secured in the block member 10 and extends to the right from the block 10 as shown in FIG. 1.

Cooperating with the right-hand end of the block 10 as viewed in FIG. 1 and extending into the recess 36 is block member 40 of insulating material which may be formed as a cylinder. The member 40 has a sample passage 42 extending therethrough into the outlet end of which a nipple 44 is inserted for connection to the inlet end of waste conduit, not shown. The inlet end of the passage 42 is through the bottom of a recess 46 having a shape complemental to the cone-like boss 32. The recess 46 is spaced from the surface of the cone 32 of the member 10 to provide a passage between the members 10, 40 for electrolyte discharge from the passage 28, which passage between the members 10, 40 extends completely around the sample path in communication therewith. A suitable annular gasket or O-ring is carried by one of the members 10, 40 so as to provide a seal between these members in the recess 36, the gasket being indicated at 48. As will appear more fully hereinafter, the construction and arrrangement of the elements may be such that the members 10, 40 may be adjusted relatively toward and away from one another so that the passage formed in part by the cone 32 may have its cross sectional dimension enlarged or restricted. However, as the cross sectional dimension or the last-mentioned passage may be relatively very small in at least some analysis applications, either the cone 32 or the cooperating recess 46 may be lapped in fabrication, and the mounting of the members 10 and 40 may be such that the cone 32 actually bottoms in the recess 46, while providing a passage therebetween.

As seen in FIG. 1, the members 10, 40 provide therebetween an annular chamber, in communication with the recess 46, for receipt of electrolyte discharged from the passage 28 and which chamber is bounded in part by the aforementioned cylindrical shoulder 34 and in part by the gasket 48. This annular chamber, indicated at 50, feeds electrolyte or filling solution of the reference electrode, received from the passage 28, to the passage formed in part by the aforementioned conical recess 46 extending completely around the sample path for communication of the electrolyte with the sample. This passage last described is, of course, the liquid junction of the electrolyte with the sample.

In the illustrated form of the invention, the block member 40 is supported from the block member 10, the member 10 being capable of support in any of various conventional ways not shown. For the support of the member 40 from the member 10, there is illustrated, by way of example, a notched yoke plate 51 provided to cooperate with notches in the aforementioned studs 38 in a manner such that the plate 51 is removable from the studs 38. As shown in FIG. 1, the yoke plate 51 in the central region thereof has a threaded adjusting member 52 threaded therethrough and has one end engaged in a recess in the block member 40, the threaded member 52 having at the other end thereof a head by which the member 52 may be turned for threaded adjustment in a direction toward or away from the block member 10. If desired the first mentioned end of the threaded member 52 may be held captive in the block member 40 to prevent axial movement of the threaded member 52 with reference to the member 40, while enabling angular movement of the member 52 for adjustment purposes. By adjustment of the member 52 block member 40 may be adjusted relatively toward and away from the block member 10 for the reason noted hereinabove. This construction and arrangement also enables the block member 40 to be removed from the block member 10 so that the surface of the cone 32 and the conical recess 46 may be cleaned in the unlikely event that the aforementioned liquid junction formed by these parts becomes clogged. It is to be noted that the fit of the block member 40 within the seal-equipped recess 46 of block 10 is sufficient to center the former so that the block members 10, 40 are properly aligned so as to provide the open liquid junction extending between the cone 32 and the conical recess 46.

In the illustrated form, it will be noted that the liquid junction formed as aforesaid is located downstream with reference to the sample passage of the ion-selective electrode. This is usually the preferred arrangement, but, if desired, the aforementioned liquid junction may be upstream of the ion-selective portion of the electrode structure. However, it is important that the cone 32, forming part of the liquid junction face in the direction with the reference to sample flow that is shown in FIG. 1. The inclination of the liquid junction in the direction last indicated inhibits sample flowing into the liquid junction in a manner to interfere with the flow of electrolyte into the sample stream from the passage 28. One significant feature of the electrode structure is that the direction of sample flow does not influence or resist the flow of electrolyte into the sample from the liquid junction.

It has previously been indicated that the ion-selective portion of the electrode structure may take a different form. If desired, the liquid filling solution in the chamber 20 may be replaced by solid electrolyte having intimate contact with the exterior of the ion-selective membrane 16 and with the electrode 24.

The use of the electrode structure will be largely clear from the foregoing description. The sample is inletted into the inlet 26 of the tube 16 by a capillary action, if desired, as in the use of a dip-type electrode such as previously described employing a capillary tube, or the sample stream may be caused to flow continuously in the aforementioned inlet by a pressure differential. The sample inletted through the inlet 26 is discharged from the passage 12 through the nipple 44.

The electrode structure shown in FIGS. 1 and 2 is well suited for inclusion in an analysis system such as that illustrated and described in co-pending Ast et al application for U.S. Pat., Ser. No. 242,556, on Apr. 10, 1972, wherein a sample stream, segmented with an immiscible fluid such as a gas, is flowed through the electrode structure for analysis. One advantage of this electrode structure for use in such system is that the ion-selective membrane 16 of the selective electrode, exposed throughout its internal surface to the sample stream, is placed very close to the liquid junction of the reference electrode, the distance being within approximately 2 mm. Such positioning of the liquid junction with reference to the ion-sensitive surface of the sensing electrode results in good electrical contact of the electrode structure with the sample stream, even though the stream be segmented as aforesaid. Another important advantage of the electrode structure is that it exhibits superior wash characteristics when subjected to segments of wash solution intermediate the sample segments, which segments of wash solution are isolated from the sample segments by gas segments. Another advantage resides in the compactness of the electrode structure which may have a length of only approximately 1½ inches, for example.

While several preferred forms of the electrode structure have been described, it will be apparent, especially to those versed in the art, that the electrode structure may take other forms and is susceptible of various changes in details without departing from the principles of the invention.

What is claimed is:

1. An apparatus for electrochemical measurements of the continuous-flow type, comprising: first and second body members of electrical insulating material defining a continuous-flow sample passageway therethrough having a sample inlet in one of said members and a sample discharge in the other of said members, said members defining an annular electrolyte chamber and a second passageway having an outlet into said sample passageway substantially around the latter's circumference and forming an open liquid junction between said annular electrolyte chamber and said sample passageway, said second passageway being formed at said outlet thereof and throughout its length between cooperating wall surfaces of the respective members, said cooperating wall surfaces extending in a direction transverse of said sample passageway, and a sensing electrode extending into said sample passageway and having an ion-selective surface exposed in said sample passageway, one of said members being movable away from the other of said members to vary the cross-sectional dimension of said second passageway.

2. Apparatus as defined in claim 1, wherein: said passageway is formed by a conical recess in one of said members and a complemental boss on the other of said members and extending at least partially into said recess, the sample path being through said recess and said boss.

3. Apparatus as defined in claim 2, wherein: said second passageway is inclined in the direction of flow in the sample passageway.

4. Apparatus as defined in claim 2, wherein: said second passageway formed between said conical recess and said complemental boss is formed by contacting surfaces of said conical recess and said complemental boss.

* * * * *